United States Patent Office 3,378,308
Patented Apr. 16, 1968

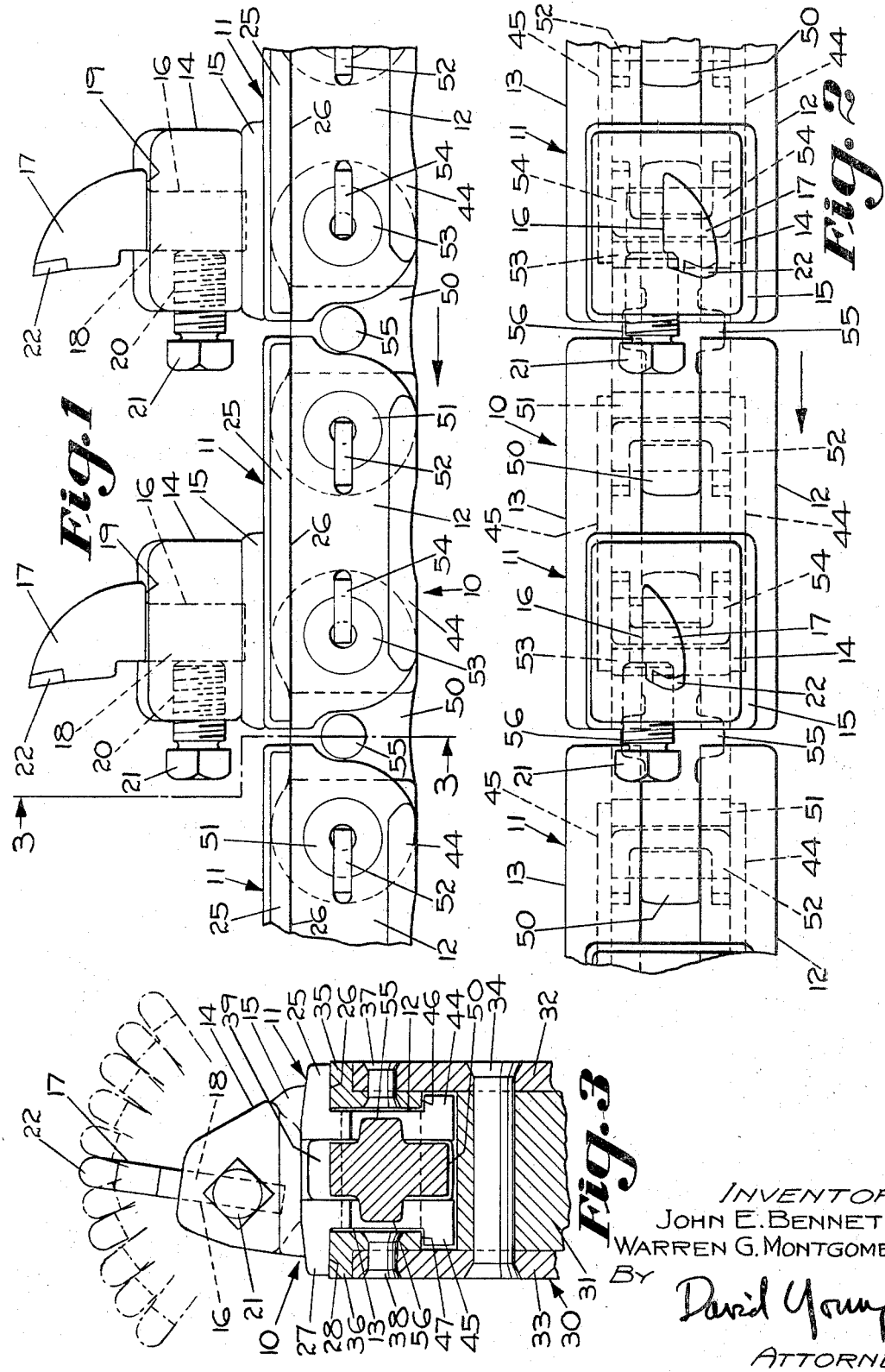

3,378,308
MINING MACHINE CUTTING CHAIN
John E. Bennett, Columbus, and Warren G. Montgomery, Worthington, Ohio, assignors to Jeffrey Galion Manufacturing Company, a corporation of Ohio
Filed Feb. 9, 1966, Ser. No. 526,141
4 Claims. (Cl. 299—84)

ABSTRACT OF THE DISCLOSURE

A mining machine cutting chain with cutter links and articulated means to connect the cutter links in succession. There is a cutting bit holder on each cutter link and the cutting bit is secured in the cutting bit holder. The cutting chain travels on a supporting and guiding rail. There is a longitudinal bearing wing on the cutter link with a downwardly facing bearing surface that bears on the supporting and guiding rail.

---

The instant invention relates to cutting chains for mining machines.

Mining machines which are used in coal mining operations to cut kerfs in the coal face, as a preliminary step before drilling and shooting the coal, have a cutter bar by which the material is cut to form such kerfs. The cutter bar extends forwardly from the mining machine and is equipped with a cutting chain that continuously travels around the perimeter of the cutter bar in an orbital path. The cutting chain has a plurality of cutting bits, which are the cutting implements that meet the coal and cut the coal to form the kerf, as the cutter bar is advanced through the coal. The cutter bar is advanced longitudinally into the mine face to the desired depth of the cut, or to the limit of the cutter bar. Then the cutter bar is moved laterally across the mine face to form the kerf across the width of the mine face. During these movements of the cutter bar, the cutting chain is traveling around the cutter bar, with the cutting bits in engagement with the coal to cut the latter, thereby forming the kerf.

As the cutter bar and the cutting chain are advanced through the coal, there is a first force acting on each cutting bit in the direction of movement of the cutting bit around the cutter bar. This first force is the pulling force that pulls the chain and the cutting bits around the cutter bar. A second force acts on each cutting bit, and this force is directed laterally with respect to the direction of movement of the cutting bit around the cutter bar. This is the force of pushing the cutting bit into the coal as it makes its cut. The forces on the cutting bit impose a load on the cutting chain and on the cutter bar. This loading of the cutting chain and cutter bar results in wear of these elements, which may be extreme in some cases of usage, and ultimately requires that the elements be replaced.

The mining machine cutting chain of the invention has its elements constructed and arranged so that the forces of the load on the cutting chain are supported in such manner that the service life of the cutting chain is increased substantially, although the loads on the cutting chain may be greater than that which is intended to be applied to the chain. There is pivot means which connects the successive cutter links in articulated manner. The cutting bit holder and the cutting bit are disposed near the forward part of the cutter link above the forward pivot means. A bearing wing extends along the cutter link and has a downwardly facing bearing surface that is above the pivot means and below the cutting edge of the cutting bit. The load of the forces on the cutting bit is supported substantially in whole on the bearing surface of the bearing wing.

The object of this invention is to provide an improved construction of cutting chain for a mining machine as described above, in which the cutter links of such chain are subjected to the force of moving the cutting chain around the cutter bar, and the force of advancing the cutting bits into the material, and in which the improved construction of each cutter link supports the load of aforementioned forces in such manner as to reduce the loading on the cutter link, and to support the load of the forces substantially on the bearing wings of the cutter links, thereby to improve the operation and wear characteristics of the cutting chain.

Other objects of the instant invention will appear hereinafter, the novel features and combinations being set forth in the appended claims.

In the drawings:
FIG. 1 is a side elevational view of a cutting chain constructed in accordance with the instant invention;
FIG. 2 is a top plan view of the cutting chain; and
FIG. 3 is a sectional view of the cutting chain, taken on the line 3—3 in FIG. 1, and showing the cutting chain supported on the cutter bar.

The cutting chain 10, constructed in accordance with this invention, comprises a plurality of cutter links 11, 11 which are connected to each other in succession to form the length of the chain 10. Each cutter link 11 has opposite side bars 12, 13, which are laterally spaced from each other.

Above the side bars 12, 13 there is a cutting bit holder 14 which extends across and spans the side bars 12, 13, and is secured to the latter by welding 15 around the base of the cutting bit holder 14. Thus, the side bars 12, 13 are secured together with the cutting bit holder 14 by the welding 15 to form the assembly of the cutter link 11.

The cutting bit holder 14 is formed with a socket 16 which extends downwardly through the cutting bit holder 14 from the top of the cutting bit holder 14. A cutting bit 17 has its shank 18 received in the socket 16, with the heel 19 of the cutting bit 17 abutting the top of the cutting bit holder 14, to set the gauge of the cutting bit 17. The cutting bit holder 14 has a threaded bore 20 which is laterally directed with respect to the socket 16 and intersects the latter. A bolt 21 is turned into the threaded bore 20 and abuts against the shank 16 of the cutting bit 17, to secure the latter in the socket 16 so that it will not be lost during the cutting operations.

As seen in FIG. 3, in phantom lines, the cutting bits 17 on the successive cutter links 11, 11 are disposed at different angular positions and fan out along an arc. Thus, successive cutting bits 17 cut different parts of the coal in the kerf, and the cumulation of such cutting is to cut the entire width of the kerf. The length of the arc along which the cutting bits 17 are disposed determines the width or thickness of the kerf that is cut in the coal faue, the latter being equal to the distance between the outermost two cutting bits.

The cutter bit holder 14 is disposed at the forward part of the cutter link 11 on the side bars 12, 13. This places the cutting bit 17 also at the forward part of the cutter link 11, with the cutting edge or cutting tip 22 of such cutting bit 17 being near the front end of the cutter link 11.

The side bar 12 has an integral bearing wing 25, which extends along the side bar 12 from the front end to the rear end thereof in the longitudinal direction of the cutter link 11. The bearing wing 25 extends along the entire length of the side bar 12 and has a downwardly facing bearing surface 26 which is laterally disposed. The side bar 13 is similarly formed with an integral bearing wing 27 and a laterally disposed, downwardly facing bearing surface 28.

The cutter links 11, 11 are supported and guided on the cutter bar 30. In the cutter bar 30 there is a frame member 31 with side plates 32, 33, which are disposed on opposite sides of the frame member 31, and are secured to the latter, as by rivets 34. A rail 35 is secured to the side plate 32, and a rail 36 is secured to the side plate 33, as by rivets 37, 38, respectively.

The cutter bar 30 is thus formed with a channel 39 between the opposite rails 35, 36. The cutting chain 10 travels in the channel 39. The lateral bearing surfaces 26, 28 of the chain side bars 12, 13 bear on the rails 35, 36, respectively, as seen in FIG. 3. The load of the forces acting on the cutting bits 17 is supported by the bearing wings 25, 27 on the rails 35, 36, which engage on the bearing surfaces 26, 28, respectively.

At the bottom of the side bar 12 there is a longitudinally extending gib 44, and at the bottom of the side bar 13 there is a similar longitudinally extending gib 45. The rail 35 has a bottom face 46, and the rail 36 similarly has a bottom face 47. The gibs 44, 45 are received under the rails 35, 36, respectively, adjacent to the bottom faces 46, 47. The gibs 44, 45 thus hold the cutting chain 10 and its cutter links 11, 11 on the cutter bar 30 in the channel 39.

A connecting link 50 is disposed between one cutter link 11 and a successive cutter link 11 to connect such cutter links 11, 11 to each other. A pivot pin 51 extends through the front part of the connecting link 50 and through the rear parts of the side bars 12, 13 of a cutter link 11 to provide an articulated connection. A cotter pin 52 extends through the pivot pin 51 and is bent over in engagement with the side bars 12, 13 to secure the pivot pin 51 in place. Another pivot pin 53 extends through the rear part of the connecting link 50 and through the front parts of the side bars 12, 13 of a successive cutter link 11, to provide an articulated connection. A cotter pin 54 is inserted through the pivot pin 53 and bent over on the side bars 12, 13 to secure the pivot pin 53 in place.

The connecting link 50 is a solid link that is disposed between the side bars 12, 13 of the cutter links 11, 11. With such articulated connections of the successive cutter links 11, 11, the latter can bend relatively to each other in moving around the cutter bar 30 in the orbital path that is defined by the cutter bar 30. The cutting chain 10 is driven in the usual manner by a suitable drive sprocket, which has its teeth engaging the cutting chain 10 in the spaces between the ends of the successive connecting links 50 in the cutter links 11, and between the side bars 12, 13 of the latter.

The connecting link 50 is formed with an integral stop pin 55 on one side and a similar integral stop pin 56 on the opposite side. The stop pins 55, 56 are spaced midway between the pivot pins 51, 53, and are disposed in alignment with the axes of the pivot pins 51, 53. As best seen in FIG. 1, the rear end of one cutter link 11 and the front end of a successive cutter link 11 are close to each other, with sufficient space therebetween to permit limited bending movement in the backward direction. The extent of such movement in the backward direction is positively limited by the stop pins 55, 56 on the connecting link 50. Such stop pins 55, 56 form abutments for the cutter links 11, 11 when they bend relatively to each other in the backward direction.

The cutting chain 10 is moved around the cutter bar 30 by a pulling force applied to the cutting chain 10 longitudinally in the direction of travel. Such pulling force acts at the cutting edge 22 of each cutting bit 17 to move the cutting bit 17 through the material that is being cut. In order to advance the cutting bar 17 into the material, for the purpose of advancing the cut, a pushing force is applied to the cutter bar 13. This pushing force acts on the cutting edges 22 of the several cutting bits 17, as these are moved through the material during the cutting action. The pulling force which moves the cutting bits 17 through the material, and the pushing force which advances the cutting bits 17 into the material, are applied along lines that are laterally disposed with respect to each other.

By way of example of the forces acting on the cutter links 11 during the cutting operation, the pulling force on the cutting chain may be 6200 pounds, and the pushing force on the cutter bar may be 6200 pounds. With seventeen (17) of the cutting bits 17 disposed in cutting engagement with the material, the pulling force on each cutting bit 17 is 365 pounds, and the pushing force on each cutting bit 17 is also 365 pounds. With the cutter link 11 having a length of six and three-fourths inches (6¾"), the bearing load on the bearing surfaces 26, 28 of the bearing wings 25, 27, respectively, at a position that is three-fourths of an inch (¾") from the rear end of the cutter link 11, is 378 pounds. The load on the gibs 44, 45 at a position three-eighths of an inch (⅜") from the front end of such gibs 44, 45 is only 13 pounds. Such loading is the result of the pulling force by which the cutting chain 10 is moved around the cutter bar 30, and of the pushing force by which the cutting bits 17 are advanced into the material that is to be cut. The loading of such forces is substantially on the bearing wings 25, 27 of the cutter link 11, so that there is very little or no load on the gibs 44, 45, as shown in the example of the forces and loading that is given above. In this manner, the loading of the pulling and pushing forces is almost entirely taken off the gibs 44, 45 and is supported on the bearing wings 25, 27. This distribution of the loading on the cutter bits 11, 11 has the overall effect of reducing the magnitude of the loading on the bearing wings 25, 27. The forces which act on the cutter link 11, including the cutting bit 17, tend to rock the cutter link 11 rearwardly in a clockwise direction, as viewed in FIG. 1. However, the loading of such forces is distributed, as described above, and the cutter links 11 are supported and guided on the cutter bar 30 in a stable condition.

The cutting chain 10 is subjected to extreme conditions of use, which is caused by the high rate cutting requirements of the cutting chain 10 in coal mining operations. Notwithstanding the extreme conditions of usage and cutting requirements, the cutting chain 10 when constructed in accordance with this invention provides for such distribution of the load on the cutter links, that there is a substantial reduction in the magnitude of the loading, and improvement in the operation of the cutting chain emanating from the improved wear characteristics of such cutting chain.

Obviously those skilled in the art may make various changes in the details and arrangement of parts without departing from the spirit and scope of the invention as defined by the claims hereto appended, and applicants therefore wish not to be restricted to the precise construction herein disclosed.

Having thus described and shown an embodiment of the invention, what it is desired to secure by Letters Patent of the United States is:

1. In a cutting chain having a plurality of cutter links, articulated means connecting said cutter links to each other in succession comprising forward pivot means at the forward part of a cutter link and rear pivot means at the rear part of a cutter link, each cutter link comprising a cutting bit holder which is disposed at the forward part of the cutter link, a cutting bit in said bit holder and means securing the cutting bit in the bit holder with the cutting edge of said cutting bit near the forward part of the cutter link and above said forward pivot means, a suporting and guiding rail for said cutting chain on which said cutter links travel in moving the cutting bits through material, each cutter link with its cutter bit holder and the cutting bit being subjected (i) to a first force that is directed longitudinally in the direction of travel of said cutting chain to move the cutting bit holders and cutting bits through the material and (ii) to a second force that is directed laterally of the direction of travel of said cutting chain to advance the cutting bit holders and the cutting bits into the material in order to progressively cut the material, a bearing wing on said cutter link disposed in bearing engagement with said supporting and guiding rail and to ride along the rail, said bearing wing extending along said cutter link in the longitudinal direction of the cutter link from the forward part of the cutter link to the rear part of the cutter link, said bearing wing being formed with a downwardly facing bearing surface that is laterally disposed in bearing engagement with said supporting and guiding rail above both the forward pivot means and the rear pivot means and below the cutting edge of the cutting bit to support the load of said first cutting bit force and said second cutting bit force substantially in whole on said bearing surface of said bearing wing.

2. In a cutting chain having a plurality of cutter links as recited in claim 1, said bearing wing being disposed at the upper part of the cutter link, and a longitudinally extending gib at the lower part of the cutter link to retain said cutting chain on said supporting and guiding rail.

3. In a cutting chain having a plurality of cutter links as recited in claim 1, including a connecting link disposed between one cutter link and a successive cutter link, said rear pivot means forming an articulated connection of said one cutter link to said connecting link, said forward pivot means forming an articulated connection of said successive cutter link to said connecting link, each cutter link including two upright side bars which are laterally spaced from each other, said connecting link extending to between said upright side bars of said one cutter link and to between said upright side bars of said successive cutter link, a bearing wing formed on each of said side bars and being oppositely disposed, and said bearing wings each being located at the top of its respective side bar.

4. In a cutter chain having a plurality of cutter links as recited in claim 1, in which said bearing wing extends from the rear end of the cutter link to the forward end of the cutter link, and the rear end of one cutter link is disposed closely adjacent to the forward end of a successive cutter link, an abutment between the rear end of said one cutter link and the forward end of said successive cutter link to limit the bending movement of said one cutter link and said successive cutter link relatively to each other.

References Cited

UNITED STATES PATENTS

| 1,782,408 | 11/1930 | Cartlidge | 299—84 |
| 2,068,808 | 1/1937 | Levin | 299—84 |

FOREIGN PATENTS

| 574,353 | 4/1933 | Germany. |
| 549,892 | 12/1942 | Great Britain. |

ERNEST R. PURSER, *Primary Examiner.*